United States Patent [19]
Noguchi

[11] Patent Number: 4,621,891
[45] Date of Patent: Nov. 11, 1986

[54] LIGHT BEAM SCANNING APPARATUS
[75] Inventor: Masaru Noguchi, Kanagawa, Japan
[73] Assignee: Fuji Photo Film Co., Ltd., Kanagawa, Japan
[21] Appl. No.: 584,263
[22] Filed: Feb. 27, 1984
[30] Foreign Application Priority Data
  Feb. 28, 1983 [JP] Japan .................................. 58-32554
  Mar. 9, 1983 [JP] Japan .................................. 58-38868
[51] Int. Cl.$^4$ ............................................. G02B 26/08
[52] U.S. Cl. .................................................. 350/6.2
[58] Field of Search ................ 250/236; 350/3.71, 6.2, 350/6.3, 6.7, 6.8, 486

[56] References Cited
U.S. PATENT DOCUMENTS
  3,922,059  11/1975  Noguchi ............................. 350/3.71
  4,054,360  10/1977  Oosaka et al. ..................... 350/486
  4,470,659   9/1984  Funato ............................... 350/3.71
  4,480,892  11/1984  Ishiwaka ............................ 350/3.71

Primary Examiner—William H. Punter
Attorney, Agent, or Firm—Sughrue, Mion, Zinn, Macpeak & Seas

[57] ABSTRACT

A light beam is made to impinge upon a plane diffraction grating formed on a rotatable plate so that the plane of incidence is a plane in which the rotation axis of the rotatable plate lies. The light beam diffracted by the diffraction grating is reflected and guided again to the diffraction grating by use of a cylindrical lens the axis of which is normal to the plane of incidence and a plane reflection mirror normal to the plane of incidence, or by use of a combination of two relay lenses having equal focal lengths with two plane reflection mirrors. The light beam diffracted again by the diffraction grating is focusing by a focusing lens onto a scanning surface, so that the scanning surface is scanned with the focused light spot along a bow-free straight scan line as the rotatable plate is rotated.

9 Claims, 7 Drawing Figures

LIGHT BEAM SCANNING APPARATUS

BACKGROUND OF THE INVENTION

1. Field of the Invention

This invention relates to a light beam scanning apparatus. This invention particularly relates to a light beam scanning apparatus utilizing a diffraction grating, typically a hologram.

2. Description of the Prior Art

As light deflectors used in light beam scanning apparatuses, there have heretofore been known a mechanical light deflector such as a multi-face rotating mirror or a galvanometer mirror, an acousto-optic light deflector utilizing the interaction between ultrasonic waves and light, a holographic light deflector utilizing a moving hologram, and the like. Among these light deflectors, the holographic light deflector is advantageous in that (i) the hologram used as the main component of the light deflector can be easily reproduced in large number by a photographic process, a thermocompression bonding process, or the like, (ii) the beam deflected by the holographic light deflector is scarcely affected by any error in the angle of inclination or wobbling of the holographic light deflector, (iii) no focusing lens need be used since the hologram itself can be made to act in the same way as a lens, and (iv) the direction of light deflection can be selected independently of the moving direction of the hologram. Thus the holographic light deflector is expected to be suitable for simplifying the construction of light beam scanning apparatuses and reducing the cost of these apparatuses.

The holographic light deflector is based on the principle that, by changing the position of the hologram plate with respect to a reconstruction beam, the direction of the first-order diffracted component of the reconstructed beam is changed. As forms of the holographic light deflector embodying this principle, there have heretofore been known a form wherein reflection type holograms are positioned on a rotatable (convex or concave) spherical surface in the rotating direction thereof, a form wherein holograms are positioned on the side face of a rotatable cylindrical body or on the side faces of a rotatable prism-like body, a form wherein holograms are positioned on a rotatable disk in the circumferential direction thereof, and the like.

Among the aforesaid forms of the holographic light deflectors, the holographic light deflector wherein reflection type holograms are positioned on a spherical surface and the holographic light deflector wherein holograms are positioned on the side face of a cylindrical body or on the side faces of a prism-like body are advantageous for the construction of a laser scanning apparatus exhibiting a high resolution. This is because, since a holographic reconstruction system which has no aberration is utilized, it is possible to obtain more than 10,000 resolution points per scan. However, in order to realize a holographic light deflector comprising the holograms positioned on the spherical surface or on the cylindrical body, it is necessary to apply a light-sensitive material such as a photographic emulsion, a photoresist or a photopolymer on the spherical surface or on the surface of the cylindrical body. From the technical viewpoint, it is not always possible to accurately apply the light-sensitive material on the spherical surface or on the surface of the cylindrical body. Further, in the holographic light deflector comprising the holograms positioned on the side faces of a prism-like body, though each hologram is fabricated in the form of a flat plate, a high assembling accuracy is required, and there is a limit to increasing of the operation speed due to a large air turbulence loss.

On the other hand, the holographic light deflector comprising the holograms positioned on a disk in the circumferential direction thereof does not exhibit the aforesaid drawbacks since the construction is very simple, and this form of deflector is expected to be most suitable for practical use. To date, however, the only case in which holographic light deflector of this type that has been put into practice is that wherein it is incorporated into a bar code reader so that scan lines can be obtained in various directions from a plurality of holograms constituting the holographic light deflector. This is mainly because, when a scan line is formed on a flat surface, the scan line becomes curved or bowed. This scan line "bow" is inconvenient for recording and readout of document information and image information.

As disclosed, for example, in U.S. Pat. Nos. 4,289,371 and 3,721,486, and Japanese Unexamined Patent publication No. 57(1982)-85018, various attempts have been made to solve the scan line bow problem arising in the holographic light deflector comprising the holograms positioned on a disk in the circumferential direction thereof.

In the method disclosed in U.S. Pat. No. 4,289,371, the diffraction grating is constructed so as to have a $\lambda/d$ ratio [wherein $\lambda$ is the wavelength of the reconstruction beam, and d is the period (constant) of the diffraction grating (hologram)] of between 1 and 1.618. In this method, however, when the wavelength $\lambda$ of the light beam used for reconstruction is e.g. 0.488 $\mu$m, the period d of the diffraction grating must be between 0.30 $\mu$m and 0.49 $\mu$m. It is not easy to accurately make a diffraction grating (hologram) having such a very short period for the following reasons. First, it is necessary to completely eliminate vibration of the photographic exposure apparatus and away of ambient air. As is well known by the experts in the art, it is not always possible to accurately expose a recording material to a holographic grating pattern having a very short period within the aforesaid range. Second, it is not always possible to obtain a recording material practically suitable for recording a diffraction grating having a period within the aforesaid range.

In the method disclosed in U.S. Pat. No. 3,721,486, a light beam is diffracted twice by use of two diffraction gratings rotating reversely at an equal speed. However, in order to rotate two diffraction gratings in reverse directions at a speed equal to each other, a complicated rotation transmitting mechanism becomes necessary, and a problem which is technically difficult to solve arises.

In the method disclosed in Japanese Unexamined Patent Publication No. 57(1982)-85018, a light beam is diffracted twice by use of two kinds of diffraction gratings (holograms) rotating synchronously with each other. However, this method requires two kinds of diffraction gratings coupled in predetermined relation to each other, and is complicated.

SUMMARY OF THE INVENTION

The first object of the present invention is to provide a light beam scanning apparatus using a rotatable plate-like light deflector comprising a diffraction grating, typically a hologram, which forms an essentially bow-free straight scan line on a plane.

The second object of the present invention is, when accomplishing the aforesaid first object, to make it possible to use a diffraction grating having a comparatively long period, and thereby to facilitate fabrication of the diffraction grating.

The third object of the present invention is to eliminate the necessity of using a complicated rotation transmitting mechanism when accomplishing the aforesaid first object.

The fourth object of the present invention is to eliminate the necessity of using two kinds of diffraction gratings and to use only one kind of diffraction grating when accomplishing the aforesaid first object.

The fifth object of the present invention is, by accomplishing the aforesaid second object, to make it possible to use a diffraction grating which can be fabricated also by ruling techniques besides holographic techniques.

The sixth object of the present invention is to improve the reliability of the apparatus and reduce the cost of the apparatus by accomplishing the aforesaid second object.

The light beam scanning apparatus in accordance with the present invention comprises a rotatable plate provided with at least one plane diffraction grating, a light beam source for emitting a light beam incident on said plane diffraction grating so that the plane of incidence is a plane in which the rotation axis of said rotatable plate lies, a cylindrical lens positioned on the optical path of the light beam diffracted by said plane diffraction grating so that the axis of said cylindrical lens is normal to said plane of incidence, a plane reflection mirror for reflecting said light beam by a plane reflection surface thereof normal to said plane of incidence and for guiding said light beam again to said plane diffraction grating, said plane reflection mirror being spaced by a distance equal to the focal length of said cylindrical lens from said cylindrical lens, and a focusing lens for focusing the light beam diffracted again by said plane diffraction grating onto a scanning surface, whereby said scanning surface is scanned with the focused light spot as said rotatable plate is rotated.

The present invention also provides a light beam scanning apparatus comprising a rotatable plate provided with at least one plane diffraction grating. A light beam source emits a light beam incident on said plane diffraction grating so that the plane of incidence is a plane in which the rotation axis of said rotatable plate lies. A combination of a first relay lens and a second relay lens with at least two plane reflection mirrors guides the light beam diffracted by said plane diffraction grating again to said plane diffraction grating. The first relay lens and said second relay lens have equal focal lengths and are positioned in spaced relation to each other by a distance two times the focal length along the optical path. A focusing lens focuses the light beam diffracted again by said plane diffraction grating onto a scanning surface. Each of the distance between the position where said light beam is first diffracted and said first relay lens and the distance between said second relay lens and the position where said light beam is again diffracted is equal to the focal length of said first relay lens and said second relay lens so that the scanning surface is scanned with the focused light spot as said rotatable plate is rotated.

In the light beam scanning apparatus of the present invention, it is possible to essentially eliminate the bow deviation of the scan line. Further, when correcting the scan line bow, it is possible to use a diffraction grating having a comparatively long grating period. Therefore, fabrication of the diffraction grating becomes very easy and can be accomplished by using various techniques. Also, since it is sufficient that a single rotatable plate be rotated, the light beam scanning apparatus of the present invention requires no complicated rotation transmitting mechanism. Furthermore, scan line bow can be easily corrected by use of only a single kind of diffraction grating. Thus in accordance with the present invention, it is possible to simply and cheaply realize a light beam scanning apparatus exhibiting a high performance and high reliability.

BRIEF DESCRIPTION OF THE DRAWINGS

FIG. 5 is a side view showing a second embodiment of the light beam scanning apparatus in accordance with the present invention, FIG. 6 is a side view showing a third embodiment of the light beam scanning apparatus in accordance with the present invention, and FIG. 7 is a side view showing a fourth embodiment of the light beam scanning apparatus in accordance with the present invention.

DESCRIPTION OF THE PREFERRED EMBODIMENTS

The present invention will hereinbelow be described in further detail with reference to the accompanying drawings.

Figure 1:
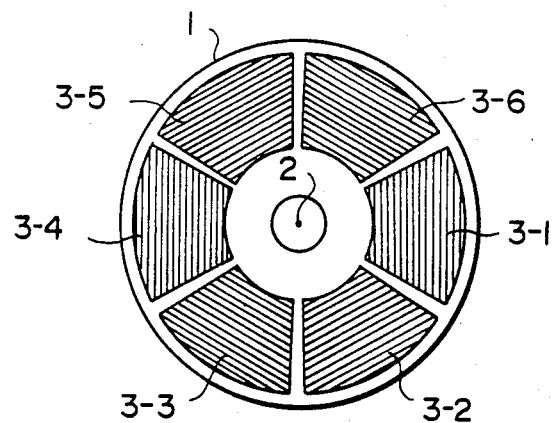
FIG. 1 is a plan view showing an example of the rotatable plate used in the light beam scanning apparatus in accordance with the present invention.

Referring to FIG. 1, a rotatable plate 1 used in the light beam scanning apparatus in accordance with the present invention is provided thereon with a plurality of plane diffraction gratings 3-1, 3-2, . . . , 3-6 positioned around a rotation axis 2. The number of the diffraction gratings is not necessarily limited to six, but may be an arbitrary number of one or more. The direction of the grating lines of each diffraction grating should preferably be tangent to the rotating direction of the rotatable plate 1.

Figure 2:
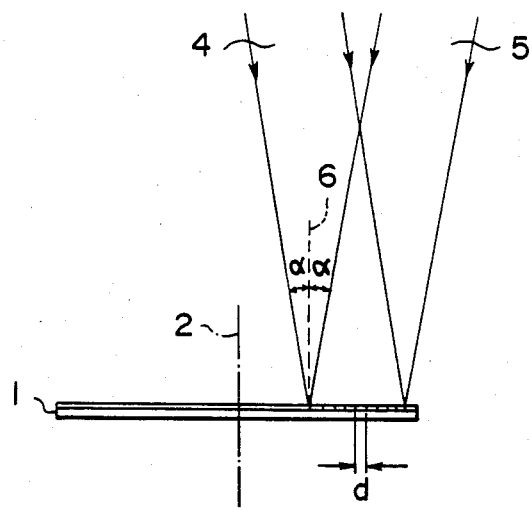
FIG. 2 is a side view showing a method of making the plane diffraction grating used in the light beam scanning apparatus in accordance with the present invention.

The diffraction gratings 3-1, 3-2, . . . , 3-6 can be fabricated by various methods. FIG. 2 shows a method of directly fabricating the diffraction gratings by a holographic technique. In FIG. 2, plane waves 4 and 5 which are coherent with respect to each other and which have a wavelength $\lambda$ are made to impinge upon the rotatable plate 1 provided thereon with a layer of a recording medium. Thus the rotatable plate 1 is exposed a predetermined number of times to interference fringes formed by the interference between the plane waves 4 and 5 via a predetermined mask. The number of exposures is equal to the number of the diffraction gratings to be provided on the rotatable plate 1. For example, when six diffraction gratings are formed on the rotatable plate 1 as shown in FIG. 1, the rotatable plate 1 is exposed six times to the interference fringes. After each exposure is finished, the rotatable plate 1 is rotated by a predetermined angle (60° when six diffraction gratings are provided). After the exposing step is finished as described above, the recording medium on the rotatable plate 1 is subjected to treatment such as development suitable therefor, and the predetermined diffraction gratings are thereby formed on the rotatable plate 1. When the angles of incidence of the plane waves 4 and 5 impinging upon the rotatable plate 1 are equally adjusted to α symmetrically with respect to a line 6 normal to the rotatable plate 1 as shown in FIG. 2, the period d of the grating lines (interference fringes) is expressed by the equation of $$d = \lambda/(2 \sin \alpha) \ldots \quad (1)$$

By way of example, when the wavelength λ of the plane waves 4 and 5 is 0.488 μm and the angle of incidence α is 10°, the grating period d becomes 1.4 μm. The direction of the grating lines (interference fringes) is perpendicular to the plane in which the principal rays of both plane waves 4 and 5 lie (i.e. the plane of the drawing sheet in FIG. 2).

Figure 3:
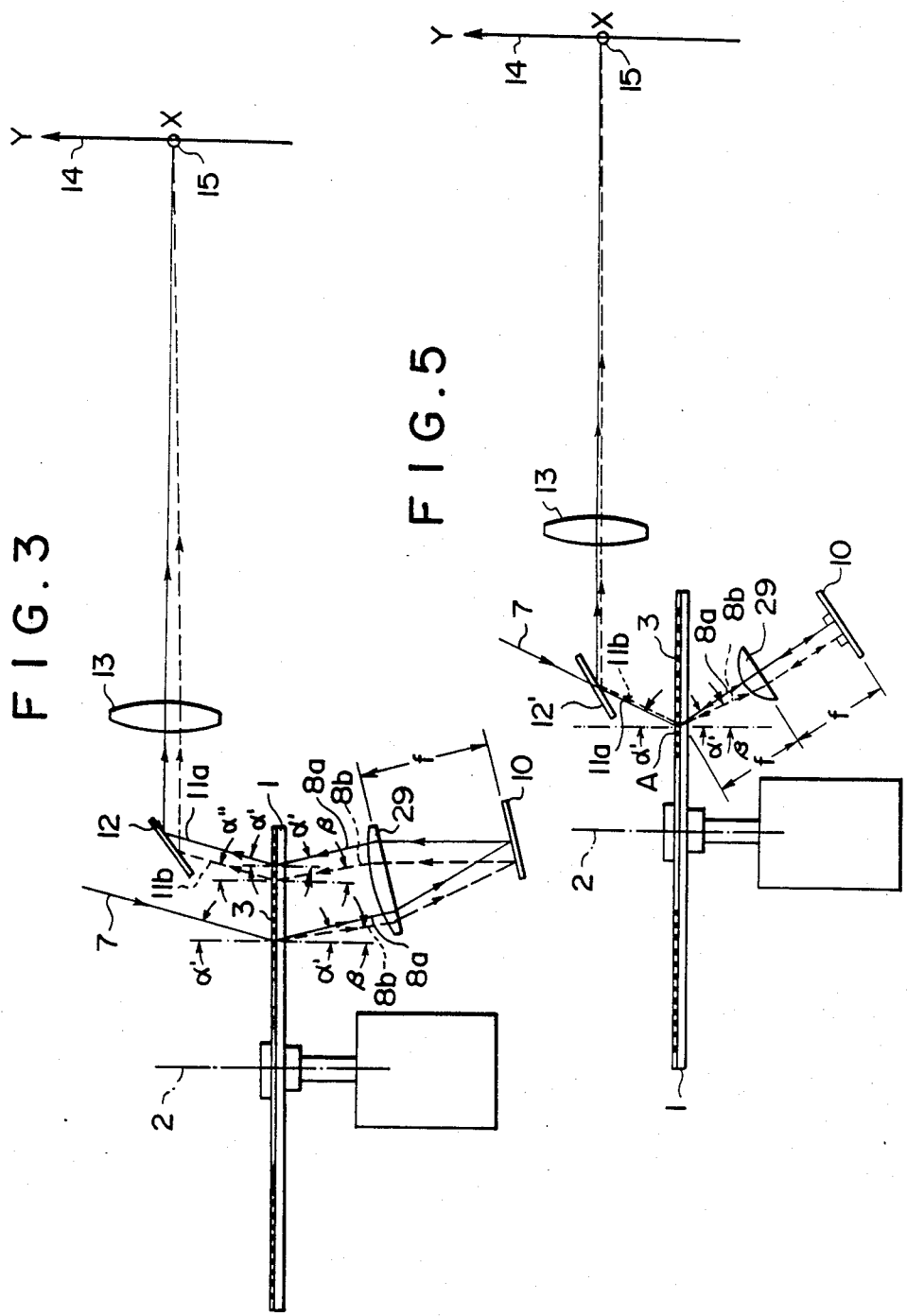
FIG. 3 is a side view showing a first embodiment of the light beam scanning apparatus in accordance with the present invention.

FIGS. 3 and 5 respectively show a first embodiment and a second embodiment of the light beam scanning apparatus in accordance with the present invention. This comprises a rotatable plate provided with at least one plane diffraction grating and a light beam source for emitting a light beam incident on said plane diffraction grating so that the plane of incidence is a plane in which the rotation axis of said rotatable plate lies. A cylindrical lens is positioned on the optical path of the light beam diffracted by said plane diffraction grating so that the axis of said cylindrical lens is normal to said plane of incidence. A plane reflection mirror reflects the light beam by a plane reflection surface thereof normal to said plane of incidence and for guiding said light beam again to said plane diffraction grating. The plane reflection mirror is spaced by a distance equal to the focal length of said cylindrical lens from said cylindrical lens. A focusing lens focuses the light beam diffracted again by the plane diffraction grating onto a scanning surface, whereby said scanning surface is scanned with the focused light spot as said rotatable plate is rotated.

A collimated light beam 7 having a wavelength λ' is made to impinge upon a diffraction grating 3 provided on the rotatable plate 1 so that the plane of incidence is a plane in which the rotation axis 2 of the rotatable plate 1 lies. That is, in the present invention, the plane of incidence is defined as the plane in which the rotation axis 2 and the incident light beam 7 lie. In FIG. 3, the plane of the drawing sheet is taken as the plane of incidence to hold the generality. In the case wherein the angle of incidence α' of the incident light beam 7 with respect to the rotatable plate 1 is adjusted to the angle determined by the equation $$d = \lambda'/(2 \sin \alpha') \ldots \quad (2)$$

wherein d is the grating period of the diffraction grating 3, the angle of diffraction of a light beam 8a generated by diffraction when the direction of the grating lines is normal to the plane of incidence (i.e. the drawing sheet in FIG. 3) becomes equal to α', and the light beam 8a also lies in the plane of incidence. However, when the direction of the grating lines is deviated from the direction normal to the plane of incidence as the rotatable plate 1 is rotated, a light beam 8b generated by diffraction in this condition does not lie in the plane of incidence but has a component normal to the plane of incidence. This means that the light beam 8b is deflected at an angle with respect to the plane of incidence. Also, the angle of projection β of the light beam 8b on the plane of incidence is changed as the direction of the grating lines is deviated from the direction normal to the plane of incidence, and becomes different from α'. Consequently, the scan line of the light beam on a scanning surface is deviated from a straight line and becomes curved or bowed. In the embodiment of FIG. 3, in order to minimize or eliminate the scan line bow on the scanning surface, the light beam generated by being once diffracted by the diffraction grating 3 is guided again to the diffraction grating 3 via a cylindrical lens 29 and a plane reflection mirror 10, and diffracted again by the diffraction grating 3.

In this case, the cylindrical lens 29 should be positioned so that the axis thereof is normal to the plane of incidence. Also, the plane reflection mirror 10 should be positioned on the optical path at a distance equal to the focal length f of the cylindrical lens 29 from the cylindrical lens 29 so that the reflection surface of the plane reflection mirror 10 is normal to the aforesaid plane of incidence.

Since the cylindrical lens 29 and the plane reflection mirror 10 are positioned under the conditions as described above, also when the light beam 8a is guided again to the diffraction grating 3, the light beam 8a lies in the aforesaid plane of incidence (i.e. the plane of the drawing sheet in FIG. 3), and the angle of re-incidence of the light beam 8a is equal to α'. Therefore, the angle of diffraction of a light beam 11a generated by being again diffracted by the diffraction grating 3 is also equal to α'. On the other hand, when the light beam 8b is guided again to the diffraction grating 3, the angle of projection of the light beam 8b on the plane of incidence is equal to β. And, when the light beam 8b is then diffracted again by the diffraction grating 3 to generate a light beam 11b, the angle of projection α" of the light beam 11b on the plane of incidence takes a value extremely close to α'. This means that, when the light beams 11a and 11b are focused by a focusing lens 13 onto a scanning surface 14, a light spot is formed at approximately the same position 15 with respect to the Y direction, and therefore the scan line bow is markedly relieved or eliminated.

The effect of the above-described first embodiment of the present invention will hereinafter be described with reference to FIG. 4. When the grating period d of the diffraction grating 3 is e.g. 1.4 μm and the wavelength λ' of the light beam used for scanning is e.g. 0.488 μm, then the angle of incidence α' of the incident light beam 7 is adjusted to 10° according to aforesaid Equation (2). As the focusing lens 13, an fθ lens which is prepared so as to form a light spot proportional to the angle of incidence of the light beam incident on the fθ lens is used. In this manner, the locus of the scan line drawn by the light spot on the scanning surface 14 is measured. When the predetermined scanning direction on the scanning surface 14 is taken as the X coordinate axis, the direction normal to the scanning direction is taken as the Y coordinate axis, and these coordinates are normalized with the focal length f of the focusing lens 13 (fθ lens), the locus of the scan line drawn on the scanning surface 14 becomes as indicated by the curve B in FIG. 4. On the other hand, when the light beams 8a and 8b once diffracted by the diffraction grating 3 are directly focused by the focusing lens 13 onto the scanning surface 14 according to the conventional procedure, the locus of the scan line drawn on the scanning surface 14 becomes as indicated by the curve A in FIG. 4. From the curves A and B, it will be understood that the degree of the scan line bow is markedly reduced in the first embodiment of the present invention.

In the first embodiment of FIG. 3, when the angle of incidence $\alpha'$ of the light beam 7 incident on the diffraction grating 3 is adjusted to 0°, a more desirable effect is obtained. Namely, in this case, the locus of the scan line drawn on the scanning surface 14 becomes straight as indicated by the curve C in FIG. 4, and no scan line bow arises.

In the first embodiment as described above, the plane reflection mirror 10 may be positioned at any angle in the plane of incidence insofar as the light beams 8a and 8b impinging upon the plane reflection mirror 10 are reflected and guided by the plane reflection mirror 10 within the effective portions of the cylindrical lens 29 and the diffraction grating 3. Further, the distance of the cylindrical lens 29 from the diffraction grating 3 may be selected arbitrarily insofar as the light beams 8a and 8b pass through the effective portion of the cylindrical lens 29.

FIG. 5 shows the second embodiment of the present invention. In the second embodiment, the incident light beam 7 is made to impinge upon the diffraction grating 3 via a semi-transparent mirror 12'. The cylindrical lens 29 having the focal length f is positioned at a distance equal to the focal length f from the diffraction point A at which the incident light beam 7 diffracted by the diffraction grating 3, and the plane reflection mirror 10 is positioned at a distance equal to the focal length f from the cylindrical lens 29. In this case, after the light beams 8a and 8b diffracted by the diffraction grating 3 pass through the cylindrical lens 29, the directions of the light beams 8a and 8b projected on the plane of incidence become parallel to each other. Therefore, the plane reflection mirror 10 is positioned perpendicularly to the light beams 8a and 8b passing through the cylindrical lens 29. As a result, when the light beams 8a and 8b impinge again on the diffraction grating 3, the positions of the light beams 8a and 8b projected on the plane of incidence coincide with the diffraction point A. Accordingly, it becomes possible to reduce the size of the diffraction grating 3 in the radial direction of the rotatable plate 1.

The degree of the effect of the aforesaid second embodiment on decreasing the scan line bow is the same as the degree of the effect of the above-described first embodiment. Further, in the second embodiment, when the incident light beam 7 is passed into the diffraction grating 3 in the direction normal thereto, the scan line bow does not arise at all. In the present invention, the aforesaid cylindrical lens also embraces a toroidal lens.

Figures 6, 7:
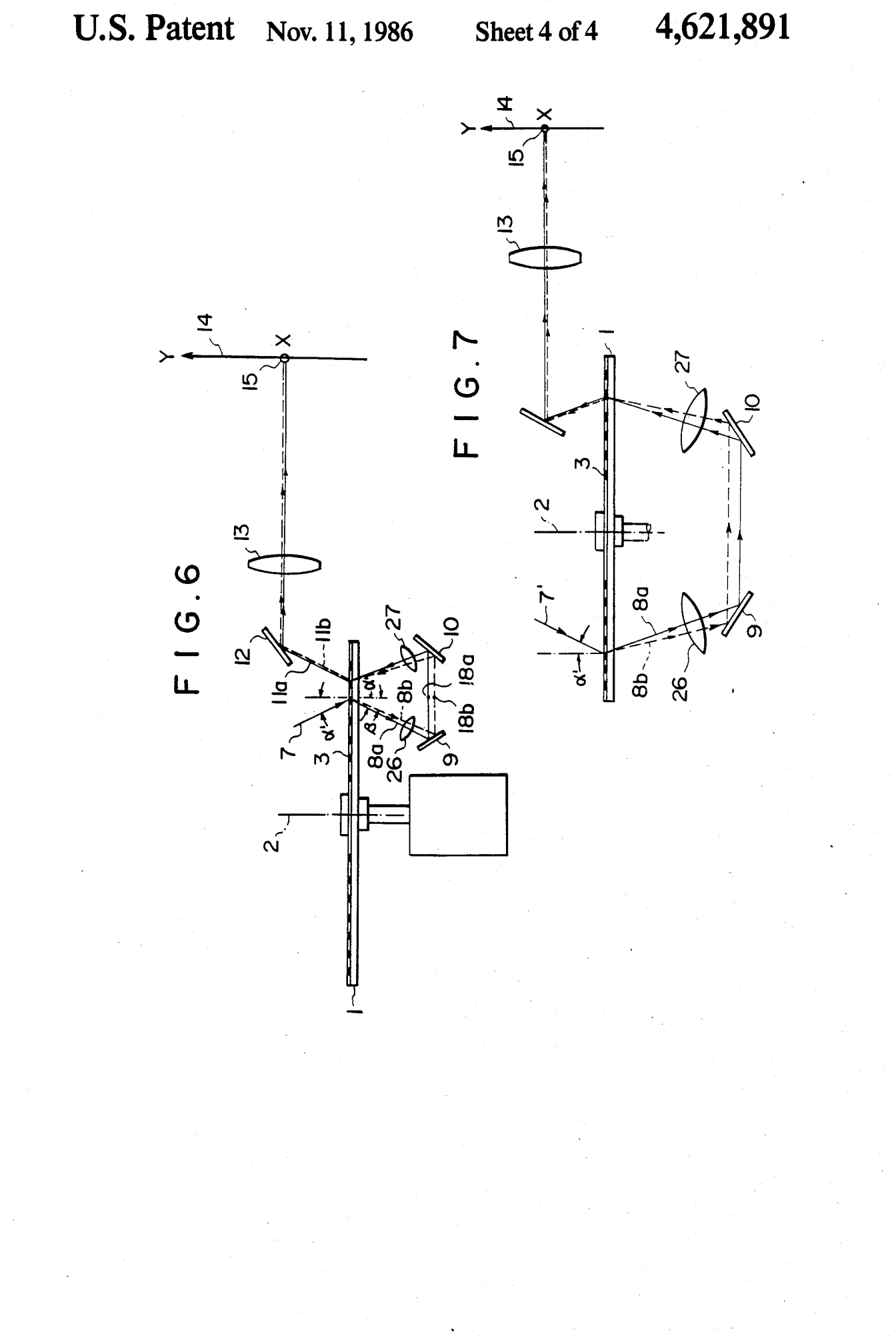

FIGS. 6 and 7 respectively show a third embodiment and a fourth embodiment of the light beam scanning apparatus in accordance with the present invention. This comprises a rotatable plate provided with at least one plane diffraction grating and a light beam source for emitting a light beam incident on said plane diffraction grating so that the plane of incidence is a plane in which the rotation axis of said rotatable plate lies. A combination of a first relay lens and a second relay lens with at least two plane reflection mirrors guides the light beam diffracted by said plane diffraction grating again to said plane diffraction grating. The first relay lens and said second relay lens have equal focal lengths and are positioned in spaced relation to each other by a distance two times the focal length along the optical path. A focusing lens focuses the light beam diffracted again by said plane diffraction grating onto a scanning surface such that each of the distance between the position where said light beam is first diffracted and said first relay lens and the distance between said second relay lens and the position where said light beam is again diffracted is equal to the focal length of said first relay lens and said second relay lens, whereby said scanning surface is scanned with the focused light spot as said rotatable plate is rotated.

In the third embodiment of FIG. 6, the light beams 8a and 8b are guided again to the diffraction grating 3 by use of a first relay lens 26 and a second relay lens 27 the optical axes of which lie in the plane of incidence, and plane reflection mirrors 9 and 10 normal to the plane of incidence. The focal lengths of the first relay lens 26 and the second relay lens 27 are equal to each other.

The light beam 8a diffracted by the diffraction grating 3 is focused by the first relay lens 26 positioned at a distance equal to the focal length f from the position where the light beam 8a is diffracted by the diffraction grating 3. The light beam 8a is then reflected by the plane reflection mirror 9, and forms a light spot 18a at a distance equal to the focal length f along the optical path from the first relay lens 26. Thereafter, the light beam 8a is again diverged and reflected by the plane reflection mirror 10. The light beam 8a is then converted to parallel light rays by the second relay lens 27 positioned at a distance equal to the focal length f along the optical path from the light spot 18a, and guided to the plane diffraction grating 3 which lies at a distance equal to the focal length f from the second relay lens 27.

On the other hand, the light beam 8b is deflected at an angle with respect to the plane of incidence and, at the same time, the angle of projection $\beta$ of the light beam 8b on the plane of incidence becomes different from $\alpha'$. Thus the incidence position of the light beam 8b impinging upon the first relay lens 26 becomes different from the incidence position of the light beam 8a on the first relay lens 26. That is, the light beam 8b has deflected components not only at an angle with respect to the plane of incidence but also in the plane of incidence. The light beam 8b is made parallel with the light beam 8a by the first relay lens 26, and reflected by the plane reflection mirror 9 in the direction parallel to the light beam 8a. Thus the light beam 8b forms a beam spot 18b at a distance equal to the focal length f along the optical path from the first relay lens 26. Then, the light beam 8b is again diverged and reflected by the plane reflection mirror 10 while the condition parallel with the light beam 8a is maintained. Thus the light beam 8b enters the second relay lens 27 positioned at a distance equal to the focal length f along the optical path from the beam spot 18b. The incidence position of the light beam 8b impinging upon the second relay lens 27 is different from the incidence position of the light beam 8a on the second relay lens 27. Namely, the incidence position of the light beam 8b on the second relay lens 27 is deflected not only in the plane of incidence but also in the direction normal to the plane of incidence with respect to the incidence position of the light beam 8a. At this time, the incidence position of the light beam 8b on the second relay lens 27 is on the same side as the incidence position thereof on the first relay lens 26 with respect to the plane of incidence, and at the same distance from the plane of incidence. Thereafter, the light beam 8b is converted to parallel light rays by the second relay lens 27 and guided to the plane diffraction grating 3. In this case, what is important is that the light beam 8b is guided to the same position on the plane diffraction grating 3 as the position to which the light beam 8a is guided.

After the light beam 8a is guided again to the plane diffraction grating 3, the light beam 8a is again diffracted by the plane diffraction grating 3 to form the light beam 11a advancing in the plane of incidence. The light beam 1a is focused by the focusing lens 13 to form the light spot 15 on the scanning surface 14 lying in the plane of incidence. On the other hand, the light beam 8b is diffracted again by the plane diffraction grating 3 to form light beam 11b. The light beam 11b projected on the plane of incidence approximately overlaps with the light beam 11a projected on the plane of incidence. However, the light beam 11b has a component in the direction normal to the plane of incidence. This is because the light beam 8b impinges upon the plane diffraction grating 3 in the condition having a component normal to the plane of incidence and, at this time, the grating lines of the plane diffraction grating 3 are in such a direction that the component of the light beam 8b normal to the plane of incidence becomes larger. Therefore, after the light beam 11b is focused by the focusing lens 13, the light beam 11b forms a light spot deviated from the light spot 15 approximately only in the X-coordinate direction normal to the plane of incidence on the scanning surface 14. This means that, as the rotatable plate 1 is rotated, the light beams 11a and 11b form an approximately straight scan line on the scanning surface 14.

The effect of the above-described third embodiment of the present invention will hereinafter be described with reference to FIG. 4. When the grating period d of the diffraction grating 3 is e.g. 1.4 μm and the wavelength λ' of the light beam used for scanning is e.g. 0.488 μm, then the angle of incidence α' of the incident light beam 7 is adjusted to 10° according to aforesaid Equation (2). As the focusing lens 13, an fθ lens which is prepared so as to form a light spot proportional to the angle of incidence of the light beam incident on the fθ lens is used. In this manner, the locus of the scan line drawn by the light spot on the scanning surface 14 is measured. When the predetermined scanning direction on the scanning surface 14 is taken as the X coordinate axis, the direction normal to the scanning direction is taken as the Y coordinate axis, and these coordinates are normalized with the focal length f of the focusing lens 13 (fθ lens), the locus of the scan line drawn on the scanning surface 14 becomes as indicated by the curve B in FIG. 4. On the other hand, when the light beams 8a and 8b once diffracted by the diffraction grating 3 are directly focused by the focusing lens 13 onto the scanning surface 14 according to the conventional procedure, the locus of the scan line drawn on the scanning surface 14 becomes as indicated by the curve A in FIG. 4. From the curves A and B, it will be understood that the degree of the scan line bow is markedly reduced in the third embodiment of the present invention.

Figure 4:
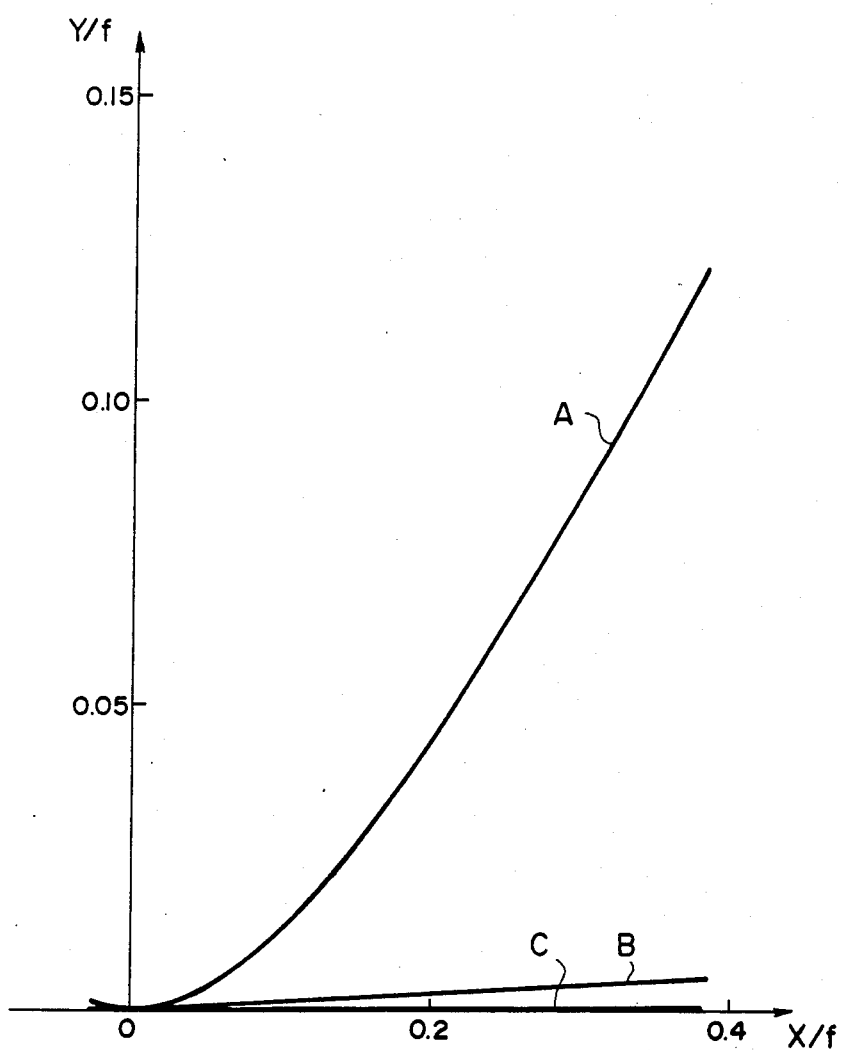
FIG. 4 is an explanatory graph showing the effect of the first embodiment of the present invention on correction of the scan line bow.

In the third embodiment of FIG. 6, when the angle of incidence α' of the light beam 7 incident on the diffraction grating 3 is adjusted to 0°, the locus of the scan line drawn on the scanning surface 14 becomes exactly straight as indicated by the curve C in FIG. 4, and no scan line bow arises.

Further, when the positions of the optical members are adjusted so that the light beams 8a and 8b passing through the second relay lens 27 impinge upon the same position on the plane diffraction grating 3 as the incidence position thereon of the incident light beam 7, it becomes possible to decrease the size of the plane diffraction grating 3.

FIG. 7 shows the fourth embodiment of the light beam scanning apparatus in accordance with the present invention. In this embodiment, two positions of diffraction by the plane diffraction grating 3 are set on the opposite sides of the rotation axis 2 of the rotatable plate 1. The light beams 8a and 8b in this embodiment form the optical paths in the same manner as those of the light beams 8a and 8b in the third embodiment shown in FIG. 6. Thus the light spot 15 and a light spot deviated from the light spot 15 approximately only in the X-coordinate direction normal to the plane of incidence are formed on the scanning surface 14. Also in the fourth embodiment, the scan line bow is reduced markedly. Further, when the angle of incidence α' of the incident light beam 7 is adjusted to 0°, the scan line bow does not arise at all.

In the above-described embodiments of the present invention, the diffraction grating can be fabricated not only by a method of directly applying the holographic techniques but also by a method of photographically duplicating the holograms or preparing replicas by use of a master hologram, a method of applying ruling techniques, a method of preparing replicas by use of a master grating fabricated by ruling techniques, and the like.

Further, the rotatable plate provided with the diffraction grating need not necessarily be circular but may for example be polygonal.

I claim:

1. A light beam scanning apparatus comprising a rotatable plate provided with at least one plane diffraction grating, a light beam source for emitting a light beam incident on said plane diffraction grating so that the plane of incidence is a plane in which the rotation axis of said rotatable plate lies, a cylindrical lens positioned on the optical path of the light beam diffracted by said plane diffraction grating so that the axis of said cylindrical lens is normal to said plane of incidence, a plane reflection mirror for reflecting said light beam by a plane reflection surface thereof normal to said plane of incidence and for guiding said light beam again to said plane diffraction grating, said plane reflection mirror being spaced by a distance equal to the focal length of said cylindrical lens from said cylindrical lens, and a focusing lens for focusing the light beam diffracted again by said plane diffraction grating onto a scanning surface, whereby said scanning surface is scanned with a focused light spot as said rotatable plate is rotated.

2. An apparatus as defined in claim 1 wherein the direction of the grating lines of said plane diffraction grating is tangent to the rotating direction of said rotatable plate.

3. An apparatus as defined in claim 1 wherein said light beam is made to impinge upon said plane diffraction grating via a semi-transparent mirror, and said light beam diffracted again by said plane diffraction grating is focused by said focusing lens via said semi-transparent mirror onto said scanning surface.

4. An apparatus as defined in claim 1, 2 or 3 wherein the angle of incidence of said light beam incident on said plane diffraction grating is 0°.

5. A light beam scanning apparatus comprising a rotatable plate provided with at least one plane diffraction grating, a light beam source for emitting a light beam incident on said plane diffraction grating so that the plane of incidence is a plane in which the rotation axis of said rotatable plate lies, a combination of a first relay lens and a second relay lens with at least two plane reflection mirrors for guiding the light beam diffracted by said plane diffraction grating again to said plane diffraction grating, said first relay lens and said second relay lens having equal focal lengths and being positioned in spaced relation to each other by a distance two times the focal length along the optical path, and a focusing lens for focusing the light beam diffracted again by said plane diffraction grating onto a scanning surface, wherein each of the distance between the position where said light beam is diffracted first and said first relay lens and the distance between said second relay lens and the position where said light beam is again diffracted is equal to the focal length of said first relay lens and said second relay lens, whereby said scanning surface is scanned with a focused light spot as said rotatable plate is rotated.

6. An apparatus as defined in claim 5 wherein the direction of the grating lines of said plane diffraction grating is tangent to the rotating direction of said rotatable plate.

7. An apparatus as defined in claim 5 wherein said first relay lens and said second relay lens are positioned so that the optical axes thereof lie in said plane of incidence, and said at least two plane reflection mirrors are positioned in the direction normal to said plane of incidence.

8. An apparatus as defined in claim 5 wherein the two positions of diffraction by said plane diffraction grating are set on the opposite sides of said rotation axis of said rotatable plate.

9. An apparatus as defined in any of claims 5 to 8 wherein the angle of incidence of said light beam incident on said plane diffraction grating is 0°.

* * * * *